US011606507B1

(12) United States Patent
Zhao et al.

(10) Patent No.: US 11,606,507 B1
(45) Date of Patent: Mar. 14, 2023

(54) AUTOMATED LENS ADJUSTMENT FOR HYPERSPECTRAL IMAGING

(71) Applicant: X Development LLC, Mountain View, CA (US)

(72) Inventors: Allen Richard Zhao, Mountain View, CA (US); Jerome Nowak, Stanford, CA (US); Benoit Schillings, Los Altos Hills, CA (US)

(73) Assignee: X Development LLC, Mountain View, CA (US)

( * ) Notice: Subject to any disclaimer, the term of this patent is extended or adjusted under 35 U.S.C. 154(b) by 302 days.

(21) Appl. No.: 17/005,735

(22) Filed: Aug. 28, 2020

(51) Int. Cl.
*G01J 3/28* (2006.01)
*H04N 5/235* (2006.01)
(Continued)

(52) U.S. Cl.
CPC ............ *H04N 5/2352* (2013.01); *G01J 3/28* (2013.01); *G01J 3/2823* (2013.01); *G02B 3/14* (2013.01);
(Continued)

(58) Field of Classification Search
CPC ....... H04N 5/2352; H04N 5/2354; G01J 3/28; G01J 3/2823; G01J 2003/2826; G02B 3/14; G02B 7/28; G02F 1/294; G02F 2203/28
See application file for complete search history.

(56) References Cited

U.S. PATENT DOCUMENTS 5,040,229 A   8/1991   Lee
5,835,633 A   11/1998  Fujisaki et al.
(Continued)

FOREIGN PATENT DOCUMENTS

AU   2014292179   12/2015
CN   108921822    11/2018
(Continued)

OTHER PUBLICATIONS ai.googleblog.com [online], "MobileNetV2: The Next Generation of On-Device Computer Vision Networks," Apr. 3, 2018, retrieved on Mar. 22, 2021, retrieved from URL<https://ai.googleblog.com/2018/04/mobilenetv2-next-generation-of-on.html>, 4 pages.
Akai et al., "Distortion-Adaptive Grape Bunch Counting for Omni-directional Images," CoRR, Aug. 2020, arxiv.org/pdf/2008.12511v1, 8 pages.
(Continued)

*Primary Examiner* — Abdullahi Nur
(74) *Attorney, Agent, or Firm* — Kilpatrick Townsend & Stockton LLP

(57) ABSTRACT

A system and method for automated lens adjustment for hyperspectral imaging is described. The system includes an image sensor and an electrically-controllable element arranged to set a spectral band for image capture by (i) selectively providing light for a selected spectral band or (ii) selectively filtering light to a selected spectral band. The system includes a tunable lens that is adjustable to change a focal length of the lens; and one or more data storage devices storing data that indicates different focus adjustment parameters corresponding to different spectral bands. The system includes a control system configured to perform operations including: selecting a spectral band; controlling the electrically-controllable element to set the spectral band for image capture; retrieving the focus adjustment parameter that corresponds to the spectral band; adjusting the lens based on the retrieved focus adjustment parameter; and capturing an image of the subject while the lens remains adjusted.

20 Claims, 7 Drawing Sheets

(51) Int. Cl.
  *G02B 3/14* (2006.01)
  *G02B 7/28* (2021.01)
  *G02F 1/29* (2006.01)
(52) U.S. Cl.
  CPC ............. *G02B 7/28* (2013.01); *H04N 5/2354* (2013.01); *G01J 2003/2826* (2013.01); *G02F 1/294* (2021.01); *G02F 2203/28* (2013.01)

(56) References Cited

U.S. PATENT DOCUMENTS

| | | |
|---|---|---|
| 7,840,071 B2 | 11/2010 | Tang |
| 8,164,673 B2 | 4/2012 | Horie |
| 8,284,991 B2 | 10/2012 | Tojo et al. |
| 8,406,469 B2 | 3/2013 | Fisher |
| 8,860,942 B1 | 10/2014 | Ewing et al. |
| 9,107,624 B2 | 8/2015 | Darty |
| 9,251,431 B2 | 2/2016 | Doepke |
| 9,268,110 B2 | 2/2016 | Bueler et al. |
| 9,945,721 B2 | 4/2018 | Abolbashari et al. |
| 10,452,924 B2 | 10/2019 | Adato |
| 10,453,197 B1 | 10/2019 | Cholakkal et al. |
| 10,810,723 B2 | 10/2020 | Onoro-Rubio et al. |
| 2008/0118106 A1 | 5/2008 | Kilambi et al. |
| 2012/0147342 A1* | 6/2012 | Lin ............... G03B 3/04 353/122 |
| 2015/0212326 A1* | 7/2015 | Kress ............... G02B 27/0172 349/11 |
| 2016/0358027 A1 | 12/2016 | Hotta et al. |
| 2017/0147905 A1 | 5/2017 | Huang et al. |
| 2017/0316285 A1 | 11/2017 | Ahmed et al. |
| 2018/0284273 A1 | 10/2018 | Buettgen et al. |
| 2019/0065880 A1 | 2/2019 | Loginov |
| 2019/0139193 A1 | 5/2019 | Navarrete |
| 2019/0205643 A1 | 7/2019 | Liu et al. |

FOREIGN PATENT DOCUMENTS

| | | |
|---|---|---|
| CN | 110084311 | 8/2019 |
| CN | 108052984 B | 11/2019 |
| CN | 110647793 | 1/2020 |
| EP | 2208974 | 7/2010 |
| EP | 3567518 | 11/2019 |
| WO | WO 2007/098123 | 8/2007 |
| WO | WO 2016/095117 | 6/2016 |
| WO | WO 2017/223206 | 12/2017 |
| WO | WO 2018/141429 | 8/2018 |
| WO | WO 2018/187632 | 10/2018 |
| WO | WO 2019/084854 | 5/2019 |

OTHER PUBLICATIONS analyticsvidhya.com [online], "It's a Record-Breaking Crowd! A Must-Read Tutorial to Build your First Crowd Counting Model using Deep Learning," Feb. 18, 2019, retrieved on Mar. 22, 2021, retrieved from URL<https://www.analyticsvidhya.com/blog/2019/02/building-crowd-counting-model-python/>, 48 pages.
Barbin et al., "Near-infrared hyperspectral imaging for grading and classification of pork," Meat Science, Jul. 2011, 90:259-268.
Bargoti et al., "Deep fruit detection in orchards," 2017 IEEE International Conference on Robotics and Automation, Jun. 2017, 8 pages.
Baweja et al., "StalkNet: A Deep Learning Pipeline for High-Throughput Measurement of Plant Stalk Count and Stalk Width," Field and Service Robotics, Nov. 2017, pp. 271-284.
Chen et al., "Predicting the anthocyanin content of wine grapes by NIR hyperspectral imaging," Food Chemistry, Sep. 2014, 172:788-793.
Cohen et al., "Count-ception: Counting by Fully Convolutional Redundant Counting," Proceedings of the IEEE International Conference on Computer Vision, 2017, pp. 18-26.
Dahab et al., "Automated Brain Tumor Detection and Identification Using Image Processing and Probabilistic Neural Network Techniques," International Journal of Image Processing and Visual Communication, 2012, 1(2):2319-1724.
ElMasry et al., "Chemical-free assessment and mapping of major constituents in beef using hyperspectral imaging," Journal of Food Engineering, Feb. 2013, 117:235-246.
Gao et al., "Counting Dense Objects in Remote Sensing Images," CoRR, Feb. 2020, arxiv.org/abs/2002.05928, 5 pages.
Gao et al., "Intra-Ensemble in Neural Networks," CoRR, Apr. 2019, arxiv.org/abs/1904.04466, 5 pages.
Gao et al., "PSCNet: Pyramidal Scale and Global Context Guided Network for Crowd Counting," CoRR, Dec. 2020, arxiv.org/pdf/2012.03597v, 11 pages.
Godi et al., "SIMCO: SIMilarity-based object Counting," CoRR, Oct. 2020, arxiv.org/pdf/1904.07092v2, 6 pages.
Goel et al., "Low-Power Object Counting with Hierarchical Neural Networks," CoRR, Jul. 2020, arxiv.org/pdf/2007.01369v1, 6 pages.
Guan et al., "Understanding the Ability of Deep Neural Networks to Count Connected Components in Images," CoRR, Jan. 2021, arxiv.org/abs/2101.01386, 7 pages.
Habermann et al., "Supervised band selection in hyperspectral images using single-layer neural networks," International Journal of Remote Sensing, Dec. 2018, 40(10):1-27.
Habermann et al., "Unsupervised Hyperspectral Band Selection Using Clustering and Single-layer Neural Network," Revue Française de Photogrammétrie et de Télédétection, Société Française de Photogrammétrie et de Télédétection, Sep. 2018, hal-01880365:33-42.
Halstead et al., "Fruit Quantity and Quality Estimation using a Robotic Vision System," CoRR, Jan. 2018, arxiv.org/abs/1801.05560, 8 pages.
Hani et al., "Apple Counting using Convolutional Neural Networks," 2018 IEEE/RSJ International Conference on Intelligent Robots and Systems, Oct. 2018, 8 pages.
Kamruzzaman et al., "Non-destructive prediction and visualization of chemical composition in lamb meat using NIR hyperspectral imaging and multivariate regression," Innovative Food Science and Emerging Technologies, Jun. 2012, 16:218-226.
Kasmani et al., "A-CCNN: adaptive ccnn for density estimation and crowd counting," CoRR, Apr. 2018, arxiv.org/abs/1804.06958, 5 pages.
Koirala et al., "Deep learning for real-time fruit detection and orchard fruit load estimation: benchmarking of MangoYOLO," Precision Agriculture, Feb. 2019, 20:1107-1135.
Lempitsky et al., "Learning To Count Objects in Images," Advances in neural information processing systems, 2010, 23:1324-32.
Liu et al., "Robust Fruit Counting: Combining Deep Learning, Tracking, and Structure from Motion," 2018 IEEE/RSJ International Conference on Intelligent Robots and Systems, Oct. 2018, 8 pages.
Machinelearningmastery.com [online], "How to Configure Image Data Augmentation in Keras," Apr. 12, 2019, retrieved on Jun. 29, 2020, retrieved from URL https://machinelearningmastery.com/how-to-configure-image-data-augmentation-when-training-deep-learning-neural-networks/, 16 pages.
Marsden et al., "People, Penguins and Petri Dishes: Adapting Object Counting Models To New Visual Domains And Object Types Without Forgetting," CoRR, Nov. 2017, arxiv.org/pdf/1711.05586v1, 10 pages.
mathworks.com [online], "resnet101," Oct. 24, 2018, retrieved on Mar. 22, 2021, retrieved from URL<https://www.mathworks.com/help/deeplearning/ref/resnet101.html>, 3 pages.
Mikami et al., "DeepCounter: Using Deep Learning to Count Garbage Bags," 2018 IEEE 24th International Conference on Embedded and Real-Time Computing Systems and Applications, Jan. 2019, 10 pages.
Nesteruk et al., "Image Augmentation for Multitask Few-Shot Learning: Agricultural Domain Use-Case," CoRR, Feb. 2021, arxiv.org/abs/2102.12295, 12 pages.
Noroozi et al., "Representation Learning by Learning to Count," Proceedings of the IEEE International Conference on Computer Vision, 2017, pp. 5898-5906.

(56) References Cited

OTHER PUBLICATIONS pytorch.org/hub/pytorch_vision_mobilenet [online], "Mobilenet V2," Jul. 22, 2019, retrieved on Mar. 22, 2021, retrieved from URL<https://pytorch.org/hub/pytorch_vision_mobilenet_v2/>, 2 pages.
Rahnemoonfar et al., "Deep Count: Fruit Counting Based on Deep Simulated Learning," Sensors, Apr. 2017, 17(4):905.
researchgate.net [online], "How to count objects on the image with deep learning algorithms?," Apr. 30, 2020, retrieved on Mar. 22, 2021, retrieved from URL<https://www.researchgate.net/post/How-to-count-objects-on-the-image-with-deep-learning-algorithms>, 8 pages.
Sam et al., "Switching Convolutional Neural Network for Crowd Counting," 2017 IEEE Conference on Computer Vision and Pattern Recognition, 11 pages.
Santos de Arruda et al., "Counting and Locating High-Density Objects Using Convolutional Neural Network," CoRR, Feb. 2021, arxiv.org/abs/2102.04366, 15 pages.
Segui et al., "Learning to Count With Deep Object Features," Proceedings of the IEEE Conference on Computer Vision and Pattern Recognition, 2015, pp. 90-96.
Shang et al., "End-to-end crowd counting via joint learning local and global count," 2016 IEEE International Conference on Image Processing, Sep. 2016, pp. 1215-1219.
softwaremill.com [online], "Counting Objects with Faster R-CNN," June 2, 2017, retrieved on Mar. 22, 2021, retrieved from URL<https://softwaremill.com/counting-objects-with-faster-rcnn/>, 20 pages.
Sokhandan et al., "A Few-Shot Sequential Approach for Object Counting," CoRR, Jul. 2020, arxiv.org/pdf/2007.01899v2, 19 pages.
stackoverflow.com [online], "Tensorflow Count Objects in Image," Feb. 21, 2017, retrieved on Mar. 22, 2021, retrieved from URL<https://stackoverflow.com/questions/42375680/tensorflow-count-objects-in-image>, 2 pages.
Stein et al., "Image Based Mango Fruit Detection, Localization and Yield Estimation Using Multiple View Geometry," Sensors, Nov. 2016, 16(11):1915.
Suzuki et al., "Estimation of Chemical Composition of Grass in Meadows using Hyperspectral Imaging," Environ. Control Biol., 2008, 46(2):129-137.
Takahashi et al., "A Novel Weight-Shared Multi-Stage CNN for Scale Robustness," IEEE Transactions on Circuits and Systems for Video Technology, Apr. 2019, 29(4):1090-1101.
Tan et al., "Cells Counting with Convolutional Neural Network," Intelligent Computing Methodologies, Jul. 2018, pp. 102-111.
Towardsdatascience.com [online], "Objects Counting by Estimating a Density Map With Convolutional Neural Networks," Sep. 27, 2019, retrieved on Mar. 22, 2021, retrieved from URL<https://towardsdatascience.com/objects-counting-by-estimating-a-density-map-with-convolutional-neural-networks-c01086f3b3ec>, 12 pages.
Towardsdatascience.com [online], "R-CNN, Fast R-CNN, Faster R-CNN, YOLO—Object Detection Algorithms," Jul. 9, 2018, retrieved on Mar. 22, 2021, retrieved from URL<https://towardsdatascience.com/r-cnn-fast-r-cnn-faster-r-cnn-yolo-object-detection-algorithms-36d53571365e>, 11 pages.
Towardsdatascience.com [online], "Segmenting, localizing and counting object instances in an image," Oct. 26, 2017, retrieved on Mar. 22, 2021, retrieved from URL<https://towardsdatascience.com/segmenting-localizing-and-counting-object-instances-in-an-image-878805fef7fc>, 9 pages.
Walach et al., "Learning to Count with CNN Boosting," Computer Vision, Sep. 2016, pp. 660-676.
Xu et al., "Dilated-Scale-Aware Attention ConvNet For Multi-Class Object Counting," CoRR, Dec. 2020, arxiv.org/abs/2012.08149, 7 pages.
Yang et al., "Reverse Perspective Network for Perspective-Aware Object Counting," Proceedings of the IEEE/CVF Conference on Computer Vision and Pattern Recognition, 2020, pp. 4374-4383.
Zhan et al., "A new hyperspectral band selection approach based on convolutional neural network," 2017 IEEE International Geoscience and Remote Sensing Symposium, Jul. 23-28, 2017, pp. 3660-3663.
Zhang et al., "Cross-Scene Crowd Counting via Deep Convolutional Neural Networks," Proceedings of the IEEE Conference on Computer Vision and Pattern Recognition, 2015, pp. 833-841.
Annibale et al., "Optical measurement of focal offset in tunable lenses," Opt. Express., Jan. 2016, 24(2):1031-1036.
Cu-Nguyen et al., "An imaging spectrometer employing tunable hyperchromatic micro lenses," Light: Science & Applications, Apr. 2016, 5(e16058): 9 pages.
Cu-Nguyen et al., "Tunable hyperchromatic lens system for confocal hyperspectral sensing," Optics Express, Nov. 2013, 21(23):27611-27621.
Gat et al., "Imaging Spectroscopy Using Tunable Filters: A Review," SPIE, Apr. 2000, 4056:50-64.
Gupta et al., "Hyperspectral Imaging Using Acoustic-Optic Tunable Filters," SPIE, Apr. 1999, 3718:512-521.
Iwai et al., "Speeded-Up Focus Control of Electrically Tunable Lens by Sparse Optimization," Scientific Reports, 2019, 9(12365):1-6.
Jia et al., "Chromatic aberrations correction for imaging spectrometer based on acousto-optic tunable filter with two transducers," Optics Express, Oct. 2017, 25(20):23809-23825.
Mcgregor et al., "Adaptive hyperspectral imager: design, modeling, and control," Journal of Optics, Institute of Physics (IOP), 2015, 17(8): 11 pages.
Millian et al., "Dynamic compensation of chromatic aberration in a programmable diffractive lens," Optics Express, Jul. 2006, 14(20):9103-9112.
Shen et al., "Liquid crystal integrated metalens with tunable chromatic aberration," Advanced Photonics, 2020, 2(3):1-7.
Wang et al., "Correcting Axial Chromatic Aberration in a Fixed Focal Plane, Near-infrared Imaging System," CSBE/SCGAB 2006 Annual Conference, Jul. 16-19, 2006, 14 pages.
Zhao et al., "Chromatic aberrations correction for imaging spectrometer based on acousto-optic tunable filter with two transducers," Optics Express, Oct. 2017, 25(20):23809-23825.

* cited by examiner

| Wavelength (nanometers) 210 | Lens Deflection (millimeters) 220 |
|---|---|
| 1700 | 0.17 |
| 1400 | 0.16 |
| 1200 | 0.15 |
| 1000 | 0.14 |
| 950 | 0.13 |
| 900 | 0.12 |
| 750 | 0.11 |
| 700 | 0.10 |
| 650 | 0.09 |
| 600 | 0.08 |
| 580 | 0.07 |
| 560 | 0.06 |
| 550 | 0.05 |
| 530 | 0.04 |
| 520 | 0.03 |
| 500 | 0.02 |
| 480 | 0.01 |
| 460 | 0.00 |
| 450 | -0.01 |
| 430 | -0.02 |
| 420 | -0.03 |
| 400 | -0.04 |
| 380 | -0.05 |

420 → Lens Deflection (millimeters)

400b

| Wavelength (nm) 410 | Sample Distance (mm) 414 | | | | | | | | |
|---|---|---|---|---|---|---|---|---|---|
| | 60 | 65 | 70 | 75 | 80 | 85 | 90 | 95 | 100 |
| 1700 | 0.35 | 0.32 | 0.29 | 0.26 | 0.23 | 0.20 | 0.17 | 0.14 | 0.11 |
| 1300 | 0.34 | 0.31 | 0.28 | 0.25 | 0.22 | 0.19 | 0.16 | 0.13 | 0.10 |
| 900 | 0.33 | 0.30 | 0.27 | 0.24 | 0.21 | 0.18 | 0.15 | 0.12 | 0.09 |
| 800 | 0.32 | 0.29 | 0.26 | 0.23 | 0.20 | 0.17 | 0.14 | 0.11 | 0.08 |
| 700 | 0.31 | 0.28 | 0.25 | 0.22 | 0.19 | 0.16 | 0.13 | 0.10 | 0.07 |
| 600 | 0.30 | 0.27 | 0.24 | 0.21 | 0.18 | 0.15 | 0.12 | 0.09 | 0.06 |
| 520 | 0.29 | 0.26 | 0.23 | 0.20 | 0.17 | 0.14 | 0.11 | 0.08 | 0.05 |
| 480 | 0.28 | 0.25 | 0.22 | 0.19 | 0.16 | 0.13 | 0.10 | 0.07 | 0.04 |
| 430 | 0.27 | 0.24 | 0.21 | 0.18 | 0.15 | 0.12 | 0.09 | 0.06 | 0.03 |
| 400 | 0.26 | 0.23 | 0.20 | 0.17 | 0.14 | 0.11 | 0.08 | 0.05 | 0.02 |
| 380 | 0.25 | 0.22 | 0.19 | 0.16 | 0.13 | 0.10 | 0.07 | 0.04 | 0.01 |

AUTOMATED LENS ADJUSTMENT FOR HYPERSPECTRAL IMAGING

TECHNICAL FIELD

This disclosure application relates generally to imaging systems.

BACKGROUND

Optical imaging systems can generate images of objects. The images may be generated by collecting light waves through a lens, and focusing the light waves on a sensor. Light waves from different spectral bands may focus at different distances when passing through a lens.

SUMMARY

In some implementations, a system is configured to capture images using light from different spectral bands. The system includes a light source that can selective illuminate a subject with light of different spectral bands. The system also includes an electrically tunable lens (e.g., an electrically focus-tunable lens) that is used to adjust the focus of a camera for whichever spectral band of light is used to illuminate the subject (e.g., a target or object to be photographed). The tunable lens can be used to adjust the focus for the camera for each spectral band, so that images captured using the respective spectral bands have consistent, accurate focus.

Many lens and lens assemblies exhibit chromatic aberration, where the effective focal distance or focal length of a lens assembly is slightly different for different wavelengths. The refractive index of lens elements typically varies with the wavelength of light, resulting in changes in focal length for different wavelength. As a result, when light from one spectral band is focused to the plane of the image sensor, for that same lens configuration, light from some spectral bands would be focused in front of the image sensor while light from other spectral bands would be focused behind the image sensor. The difference in effective focal lengths for different wavelengths is especially pronounced when a lens is used over a wide range of wavelengths, such as for hyperspectral imaging where light in the ultraviolet, visible, and infrared ranges may be used. As discussed below, the tunable lens can be used to correct for these differences and provide correct focus for each of the different spectral bands.

The systems of the present disclosure can include a lens assembly that includes one or more solid lens elements (such as those made of glass, plastic, fluorite, etc.), in which each element has a traditional fixed focal length. The system can also include a tunable lens to make adjustments to compensate for the different ways that different spectral bands interact with the lens assembly. For example, the lens assembly can be adjusted to obtain a primary focus position with respect to a subject, e.g., using manual focus or autofocus techniques and a reference band of light, such as visible light. When capturing images using a second spectral band, however, the system automatically adjusts the focus of the tunable lens to correct for the difference between effective focal distance of the lens assembly for the reference band and the second band, thus maintaining accurate focus on the subject even though a different band of light is used.

The system can store adjustment data that indicates how the tunable lens should be adjusted for each of the different spectral bands that the system supports. This allows the system to provide high-quality results and consistent focus for all of the spectral bands. It also speeds the process of capturing images of a subject using multiple different spectral bands. For example, the system may be configured to capture ten images of a subject, each using light of a different spectral band. The system cycles through the ten different spectral bands, instructing the light source to produce light of each band in turn. As the system changes the spectral band used for illumination, the system also retrieves the adjustment data for the current spectral band and configures the tunable lens to provide the appropriate correction that was previously determined and stored for the current spectral band. In this manner, for each spectral band of illumination, the system automatically applies the corresponding predetermined correction to the tunable lens, resulting in reflected light from the subject being appropriately focused on the plane of the image sensor even though different spectral bands are used.

The techniques discussed herein can be used to generate hyperspectral images, e.g., a set of images including an image for each of multiple spectral bands of light. For example, the spectral bands for a hyperspectral image data set can include one or more bands of visible light, and can also include bands with wavelengths that fall outside the range of visible light, such as bands of ultraviolet light and bands of infrared light. In general, hyperspectral imaging can acquire a hyperspectral data cube, which includes a set of images with each image representing the detected light intensity for a subject for a small band of wavelengths of light.

The systems discussed herein can enable the rapid and efficient capture of high-quality hyperspectral images, having consistent effective focus for each spectral band without the need to evaluate or optically verify focus for each spectral band. For example, to capture a hyperspectral image of a subject, a main focus position can be determined once for the subject using focus adjustment of the lens assembly (e.g., with electromechanical focusing, whether manually or with autofocus processing). This main focus position can be determined with the tunable lens at a default or neutral focal length, and the main focus position for the lens assembly can be maintained for capture of all images in the hyperspectral image set. However, some or all of the images in the hyperspectral image set can be captured using different adjustments applied to the tunable lens, to maintain consistent focus across the image set. As the system instructs the light source to produce the next band of illumination, the system also retrieves and applies the stored adjustment parameter for that band using the tunable lens. As a result, the tunable lens can be adjusted to correct the focus with minimal latency, even before the illumination with that spectral band begins. In addition, this allows rapid capture of images for different spectral bands in sequence, because the application of the adjustment parameters can be done without requiring measurement or feedback during the process.

A camera with a tunable lens may be used to obtain images of samples, or subjects. Samples can include, for example, fruit to be inspected for indications of ripeness, bruises, decay, and mold. Images of fruit generated using hyperspectral light may be more accurate and detailed than images of fruit generated using primarily red, green, and blue (RGB) visible light. For example, indications of bruises, mold, and decay that are not visible when illuminated with RGB light may become visible when illuminated with hyperspectral light. Thus, fruit inspection using hyperspectral imaging may enable earlier detection of fruit defects, compared to fruit inspection using RGB imaging.

In some examples, a camera may be positioned so that a sample is within the camera's field of view. The camera and the sample may be positioned within a dark chamber, or "black box," that seals out external light. The sample can be illuminated with a light source that produces light of various wavelengths. The light source can be directed by a computer to produce light that scans sequentially through different spectral bands of the electromagnetic spectrum, allowing an image to be captured for each of the spectral bands.

For example, the light source can produce light with small wavelengths, e.g., in a visible violet spectral band of the visible electromagnetic spectrum, and then can adjust the wavelengths to become progressively larger as the light source produces light in other visible color spectral bands, eventually reaching the infrared band of the electromagnetic spectrum. The computer may control the light produced by the light source by sending a signal to the light source to produce light of a certain wavelength at a certain time.

Light produced by the light source can reflect off of the sample and be received by the camera, through the tunable lens. Light waves with different wavelengths behave differently when the light waves interact with a lens. Light with smaller wavelengths generally diffract, or bend, more than light with larger wavelengths. To focus light from various wavelengths onto a sensor of the camera at a particular focal length, and produce a high quality image, the lens can adjust one or more focus adjustment parameters. For example, the lens can adjust its position, e.g., deflection.

The computer that controls the light source can also control the tunable lens. The computer may store a data table that associates each wavelength with a lens position that can focus the particular wavelength at the desired focal length, e.g., the focal length of the camera sensor. When the computer sends the signal to the light source to produce light of a certain wavelength, the computer can reference the table in order to determine the corresponding lens position. The computer can then send a signal to the tunable lens to adjust position based on the wavelength of light that is being produced by the light source. Thus, the tunable lens can be tuned for the wavelength of light that is being produced by the light source, at approximately the same time.

In some cases, the tunable lens can adjust position based on sample range, or distance between the tunable lens and the sample, as well as based on light wavelength. For example, the computer may first calculate a lens position adjustment based on range, and then apply a correction factor based on wavelength. In some examples, the computer can store a data table that associates lens position with both sample range and wavelength.

In some examples, instead of or in addition to using a dark chamber to keep out external light, the camera can use filters to filter out light. The filters may be part of a filter wheel that can rotate in front of the tunable lens. Different sections of the filter wheel can filter out different wavelengths, only allowing a narrow band of wavelengths to pass to the camera. The light source can then produce light of many different wavelengths at the same time. In this case, instead of sending a signal to the light source to select the illumination wavelength, the computer can send a signal to the filter wheel to select the wavelength that is allowed to pass through the filter. The computer can then adjust the tunable lens based on the wavelength that passes through the filter.

In some examples, two or more cameras can be used to obtain hyperspectral images using tunable lenses. Each camera may be able to detect light within a certain range of wavelengths. For example, a first camera may detect ultraviolet light, while a second camera may detect visible light. The two or more cameras may be spaced apart from each other, e.g., at different ranges from the sample. The computer can control the tunable lenses for each camera based on the wavelength and based on the range of each camera to the sample.

One innovative aspect of the subject matter described in this specification is embodied in methods that include the actions of storing, in one or more data storage devices, focus adjustment data for an imaging system that includes a tunable lens. The imaging system includes an electrically-controllable element configured to selectively set each of multiple different spectral bands for image capture, and the focus adjustment data indicates different focus adjustment parameters corresponding to the different spectral bands. The methods include selecting a spectral band from among the multiple different spectral bands; controlling the electrically-controllable element to set the selected spectral band for image capture; retrieving the focus adjustment parameter that corresponds to the selected spectral band; controlling the tunable lens to adjust the tunable lens based on the retrieved focus adjustment parameter that corresponds to the selected spectral band; and capturing an image of the subject using the image sensor while the electrically-controllable element sets the selected spectral band for image capture and while the tunable lens is adjusted based on the retrieved focus adjustment parameter that corresponds to the selected spectral band.

Other embodiments of this and other aspects include corresponding systems, apparatus, and computer programs, configured to perform the actions of the methods, encoded on computer storage devices. A system of one or more computers or other processing devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. In some implementations, the operations include capturing a set of hyperspectral image data for the subject, the set of hyperspectral image data including an image for each of the multiple different spectral bands, each of the images is captured while (i) the electrically-controllable element sets a different spectral band for image capture and (ii) the tunable lens is adjusted according to the focus adjustment parameter that corresponds to the spectral band set for image capture by the electrically-controllable element.

In some implementations, the operations include determining a sequence in which to illuminate the subject in the different spectral bands of light; controlling the electrically-controllable element to sequentially set different spectral bands of light for image capture in the determined sequence; and adjusting the tunable lens to sequentially apply the focus adjustment parameters for the different spectral bands in a sequence that corresponds to the sequence for illuminating the subject, changes to the adjustment of the tunable lens are synchronized with changes in the spectral band of light set by the electrically-controllable element.

In some implementations, the multiple different spectral bands include multiple spectral bands outside a visible range of light.

In some implementations, the focus adjustment parameters include, for each of multiple spectral bands, a predetermined adjustment for the spectral band that is configured to compensate for a difference between (i) a focal length of the lens assembly for the spectral band and (ii) a focal length of the lens assembly for a reference spectral band.

In some implementations, the tunable lens is an electrowetting lens, a liquid crystal lens, or a polymer-based liquid lens.

In some implementations, the control system is configured to instruct the adjustment to the tunable lens based on the retrieved focus adjustment parameter that corresponds to the selected spectral band before the electrically-controllable element adjusts the system to use light of the selected spectral band.

In some implementations, the electrically-controllable element is a light source including a set of light-producing elements that are configured to produce light of the different spectral bands, and the control system is configured to selectively activate the light-producing elements.

In some implementations, the electrically-controllable element is a filter assembly including multiple filters each configured to filter light to provide a different one of the different spectral bands, and the control system is configured to selectively apply the filters to set the selected spectral band for image capture.

In some implementations, the control system is configured to perform autofocus adjustment to set a focus position of the lens assembly or the tunable lens based on a distance of the subject from the image sensor, and the adjustment to the tunable lens based on the retrieved focus adjustment parameter is applied in addition to the autofocus adjustment.

In some implementations, the focus adjustment data includes a lookup table including one or more focus adjustment parameters for each of the different spectral bands.

The techniques presented herein provide at least the following technical advantages and/or technical improvements over previously available solutions. An advantage of hyperspectral lens focusing is that the camera can produce very high quality images using light from a broad range of the electromagnetic spectrum. Many lenses are optimized to focus light from RGB spectral bands at the focal length of the camera sensor. Light with wavelengths that fall between RGB spectral bands, and outside of RGB spectral bands, may therefore focus at different focal lengths when passing through the lenses. Therefore, the resulting images may exhibit optical aberration. The optical aberration can cause an image to appear blurred and distorted. An electrically tunable lens can adjust to focus light that is between the RGB spectral bands, and light that is beyond the visible spectrum, e.g., in infrared spectral bands, onto the camera sensor.

Another advantage of hyperspectral lens focusing is that adjusting the lens position based on the light wavelength can be done quickly. Many camera systems adjust focus for a particular scene after receiving light from the scene. This can result in a time delay between the camera receiving the light and focusing the light. In contrast, using hyperspectral lens focusing techniques, a camera can adjust the tunable lens position based on a particular wavelength in advance, e.g., before receiving light at the particular wavelength. Thus, when the tunable lens receives light at the particular wavelength, the tunable lens may be already adjusted to focus the light at the appropriate focal length. This can reduce delays between receiving the light and focusing the light on the camera sensor.

Methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1A:
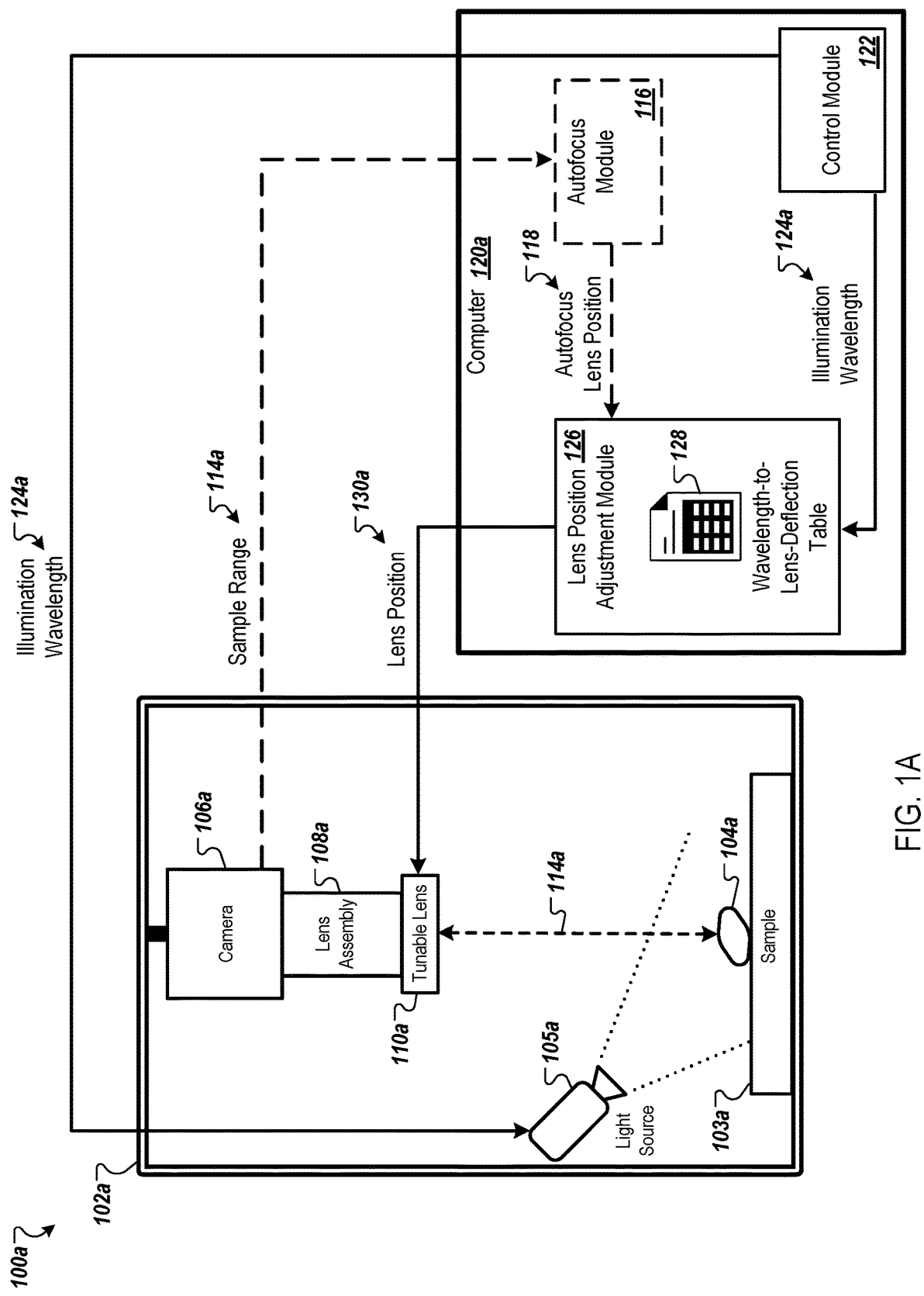
FIG. 1A shows an example system for hyperspectral imaging providing automated lens adjustment.

FIG. 1A shows an example system 100a for hyperspectral imaging providing automated lens adjustment. The system 100a includes a camera 106a, a lens assembly 108a, a tunable lens 110a, a light source 105a, and a dark chamber 102a. The camera 106a, the tunable lens 110a, and the light source 105a may be in communication with a computer 120a or other control system. For example, the camera 106a, the tunable lens 110a, and the light source 105a may send data to, and receive data from, the computer 120a over a wired or wireless connection. The computer 120a includes a control module 122 and a lens position adjustment module 126. The computer 120a optionally includes an autofocus module 116.

The autofocus module 116 can adjust the setting of the lens assembly 108a to set the correct focus position for the sample 104a based on, for example, visible light or some reference illumination. The focus position of the lens assembly 108a can then remain the same for the image captures for each of the different hyperspectral bands used. The tunable lens 110a then makes adjustments for each image capture (e.g., for each hyperspectral band), not to adjust for any change in the distance 114a of the sample 104a, but to compensate for the way that different wavelengths of light will result in different focus distances through the lens assembly 108a. In other words, while the focus position of the lens assembly 108a remains set, the adjustments to the tunable lens 110a can ensure that the combination of the tunable lens 110a and the lens assembly 108a consistently focus each different band of light reflected from the sample 104a onto the sensor plane of the camera 106a. Of course, other implementations can be made which use the tunable lens 110a for autofocus. For example, the autofocus module 116 may determine a setting of the tunable lens 110a that sets the overall focus of the tunable lens 110a and the lens assembly 108a to be appropriate for a particular wavelength band, to account for the distance 114a of the sample 104a and the camera's sensor. Then, the lens position adjustment module 126 can apply offsets or adjustments to that tunable lens position determined from autofocus, varying the tunable lens 110a setting slightly for each band to account for the different refraction of different wavelengths through the tunable lens 110a and lens assembly 108a.

The system 100a can be configured to capture images of a sample 104a. In some examples, the sample 104a may be an object to be inspected. The sample 104a may be located on a conveyor belt 103a or another platform or sample holder. The conveyor belt 103a may convey the sample 104a to a position within a field of view of the camera 106a. In some examples, the sample 104a can be a piece of fruit to be inspected. The fruit can be inspected, for example, for indications of ripeness, bruises, decay, and mold. In some examples, the conveyor belt 103a may convey the sample 104a through the field of view of the camera 106a en route to a destination, e.g., as part of a packing system.

When the sample 104a is within the field of view of the camera 106a, the camera 106a can capture light provided by the light source 105a and reflected from the sample 104a. The light source 105a can produce light in multiple spectral bands. The spectral bands used in hyperspectral image capture can include light from spectral bands across the electromagnetic spectrum. For example, spectral bands can include visible light with wavelengths that fall between and within red, green, and blue spectral bands. Spectral bands can also include light with wavelengths that fall between and within ultraviolet light spectral bands and infrared light spectral bands.

The camera 106a can generate images of the sample 104a using the reflected light. In some examples, the images of the sample 104a can be provided on a display for analysis by a human inspector. In some examples, the images of the sample 104a can be provided for analysis by a computer image analysis system.

The camera 106a can be an optical camera that can generate images from light in multiple spectral bands. For example, the camera 106a may be able to detect and generate images from spectral bands within regions of visible light, near infrared (NIR) light, infrared (IR) light, short wave infrared (SWIR) light, and near ultraviolet (NUV) light, and potentially ultraviolet light (UV) and other wavelength ranges also.

Figure 3:
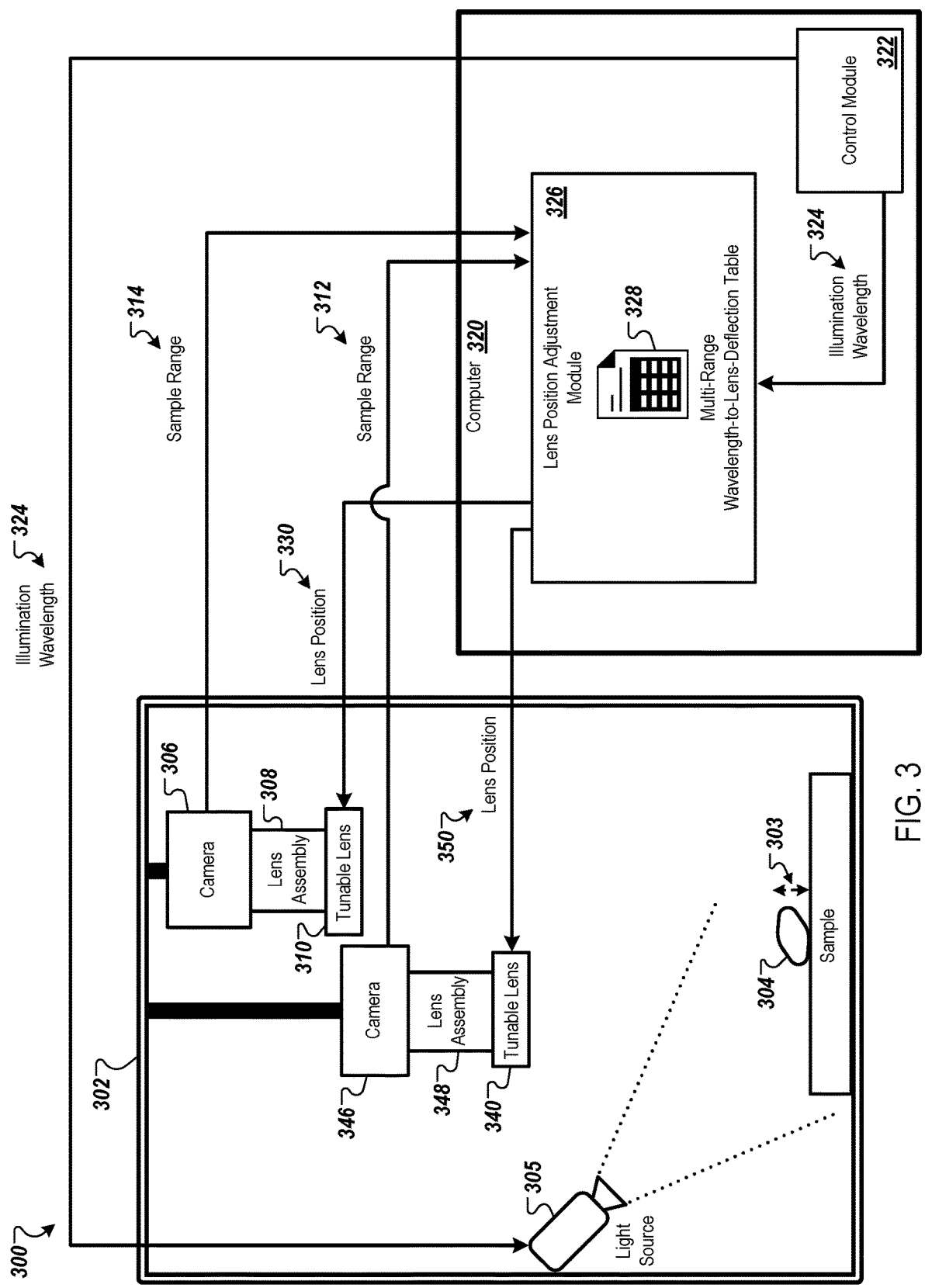
FIG. 3 shows an example system for hyperspectral imaging using multiple cameras.

In some examples, the camera 106a may include a charge-coupled device (CCD) sensor, a complementary metal-oxide semiconductor (CMOS) image sensor, or an Indium Gallium Arsenide (InGaAs) sensor. In some examples, a system for hyperspectral imaging may include multiple cameras in order to capture light from broad ranges of the electromagnetic spectrum. An example of a system that includes multiple cameras is shown in FIG. 3.

The lens assembly 108a can be any appropriate lens assembly 108a for focusing received light on sensors of the camera 106a. The lens assembly 108 can include, for example, a fixed focal length lens, a telecentric lens, or a microscope lens. In some examples, the lens assembly 108a can have a variable focal length and may be manually or electrically adjustable.

The tunable lens 110a can be any high-resolution electrically tunable lens. The tunable lens 110a may be positioned to receive light before the light enters the lens assembly 108a. For example, the tunable lens 110a may be positioned such that the lens assembly 108a is located between the tunable lens 110a and the camera 106a, as shown in FIG. 1A. In some examples, the tunable lens 110a may be positioned to receive light after the light passes through the lens assembly 108a. For example, the tunable lens 110a may be positioned in between the lens assembly 108a and the camera 106a.

The tunable lens 110a can include, for example, a fluid lens. The fluid lens may be controlled by an electromagnetic actuator. The tunable lens 110a may be capable of focusing light from widely variable working distances, or sample ranges. For example, the sample 104a may be positioned at a sample distance 114a, as measured from the tunable lens 110a. The tunable lens 110a may be capable of focusing light reflected from the sample 104a both when the sample 104a is positioned at small sample distance 114a, e.g., 50 millimeters (mm), and when the sample 104a is positioned at a large sample distance 114a, e.g., 1000 mm.

The sample distance 114a may be variable. In some examples, due to variations in sizes of samples, the sample range may be different for each individual sample. For example, a large sample may have a smaller sample distance 114a, while a small sample may have a larger sample distance 114a. In some examples, the camera 106a may be adjustable, such that the camera 106a may be repositioned to decrease or increase the sample distance 114a.

The electromagnetic actuator can be activated to adjust a position of the tunable lens 110a. Adjusting the positon of the tunable lens 110a can include adjusting a deflection, or curvature, of the lens. In some examples, the tunable lens 110a may adjust the position of the tunable lens in response to receiving a signal from the computer 120a.

Adjusting the position of the tunable lens 110a can change the optical power of the tunable lens 110a. The optical power of the tunable lens may be expressed, for example, in units of diopters (dpt). A diopter is a unit of measurement equal to a reciprocal of a focal length of a lens, as measured in meters. Thus, a higher optical power indicates a smaller, or nearer, focal length. The tunable lens 110 may be able to adjust quickly. For example, the tunable lens 110 may be able to adjust from a first optical power, e.g., 1 dpt, to a second optical power, e.g., 5 dpt, within a few milliseconds.

Figures 2A, 2B:
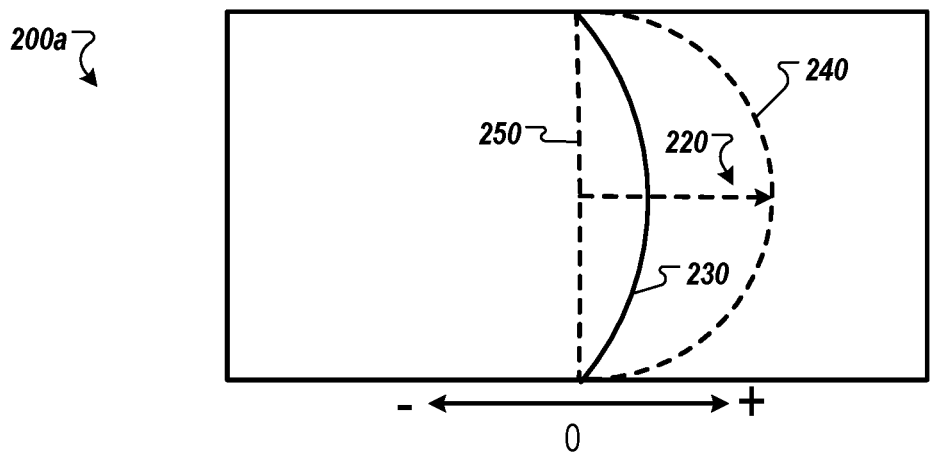
FIG. 2A shows an example diagram of tunable lens positions.
FIG. 2B shows an example table associating light wavelengths with lens positions.

FIG. 2A shows an example diagram 200a of tunable lens position In FIG. 2A, a neutral lens position 250 can be defined as a position in which the tunable lens has a deflection of zero. Deflection can be defined as a distance between a center of the tunable lens and the neutral position, e.g., measured in millimeters.

When activated, the electromagnetic actuator can adjust the deflection of the tunable lens. For example, the lens may initially be at initial lens position 230. When activated, the electromagnetic actuator may adjust the lens by moving the lens from initial lens position 230 to final lens position 240. The final lens position 240 then has a lens deflection 220. In FIG. 2A, positive deflections can be shown as deflecting to the right, and negative deflections can be shown as deflecting to the left.

Light waves with different wavelengths can behave differently when they interact with a lens. For example, light with smaller wavelengths may generally diffract more than light with larger wavelengths. To focus light from various wavelengths onto a sensor of the camera 106a at a particular distance, or focal length, from the tunable lens 110a, deflection of the tunable lens 110a can be adjusted based on the wavelength of light illuminating the sample 104a.

The light source 105a can illuminate the sample 104a with light of various illumination wavelengths 124a. In some examples, the light source 105 can include multiple light-emitting diodes (LEDs) configured to produce light of various wavelengths. For example, different LEDs may be configured to produce light within different spectral bands. The computer 120a can then selectively activate the LEDs so that only the LEDs providing light of the desired spectral band are active, thus illuminating the sample with light of the desired spectral band.

The dark chamber 102a can be configured to prevent external light from illuminating the sample 104a. In some examples, the light source 105a, the camera 106a, the lens assembly 108a, the tunable lens 110a, and the sample 104a may be enclosed within the dark chamber 102a. In some examples, some of these components may be positioned outside of the dark chamber 102a. For example, the camera 106a and the lens assembly 108a may be positioned outside of the dark chamber 102a, while the tunable lens 110a is positioned within the dark chamber 102a. In some examples, the conveyor belt 103a may convey the sample 104a into the dark chamber 102a during imaging, and may convey the sample 104a outside of the dark chamber 102a after imaging.

The light source 105a can produce light within spectral bands as determined by the control module 122. In some examples, as controlled by the control module 122, the light source 105a may produce light in a particular wavelength sequence or scanning pattern. For example, the light source 105 may increase illumination wavelength 124a progressively over time, or decrease illumination wavelength 124a progressively over time. In some examples, the control module 122 can control the illumination wavelength 124a emitted by the light source 105a by activating particular LEDs in sequence.

In an example, the control module 122 may control LEDs of the light source 105a to increase illumination wavelength 124a progressively over time from an NUV spectral band of the electromagnetic spectrum to a NIR spectral band. The light source 105a may include, for example, twenty-four LEDs, each configured to produce light within a particular spectral band between the NUV band and the NIR band. The control module 122 can activate a first LED of the light source 105a at a first time. The first LED can illuminate the sample 104a with light in the NUV band. At a second time, the control module 122 can deactivate the first LED, and activate a second LED. The second LED can illuminate the sample 104a with light of a larger wavelength, e.g., light within a violet spectral band. The control module 122 can continue to activate and deactivate LEDs at different times, in sequence, allowing image capture for each spectral band in turn as the system progresses through each of the spectral bands to be captured. As an example, FIG. 1C shows two different groups of bands for comparison. A first set of bands 180 shows the image capture response for red, green, and blue bands used in typical visible-light imaging. A second set of bands 190 shows an example of twenty four spectral bands that may be used for hyperspectral imaging. For example, for each sample an image of the sample can be taken with each of the twenty four bands illustrated. The hyperspectral bands can include several bands in non-visible wavelength ranges, such as multiple bands in each of the NIR, IR, SWIR ranges, multiple bands in each of the NUV, UV, and other ranges. Of course, depending on the application, different numbers of bands and different bands from those indicated in FIG. 1C can be used for hyperspectral imaging.

In addition to controlling the illumination wavelength 124a of light produced by the light source 105a, the control module 122 can also provide the illumination wavelength 124a to the lens position adjustment module 126. Based on the illumination wavelength 124a, the lens position adjustment module 126 can then adjust a lens position 130a of the tunable lens 110a.

The lens position adjustment module 126 can receive the illumination wavelength 124a from the control module 122. The lens position adjustment module 126 can reference a Wavelength to Lens Deflection Table 128 in order to determine the lens position 130a.

FIG. 2B illustrates an example table 200b associating light wavelengths 210 with lens deflection 220. The table 200b can be, for example, a Wavelength to Lens Deflection Table 128 for a particular tunable lens 110a.

The table 200b includes a range of wavelengths 210, expressed in units of nanometers (nm). For each wavelength 210, the table 200b provides a corresponding lens deflection 220. In FIG. 2B, only a few wavelengths 210 are shown. However, the table 200b can include any number of wavelengths 210 at any appropriate increment. In some examples, the table 200b can be generated through a calibration process performed prior to operation of the hyperspectral imaging system.

The lens deflection 220 can be a positive or negative value. The lens deflection 220 can be in reference, e.g., to the neutral lens position 250. Positive values of lens deflection 220 can indicate increasing deflection, e.g., adjusting to the right as shown in FIG. 2A.

The lens position adjustment module 126 can reference the table 200b to determine the lens deflection 220 for the illumination wavelength 124a. For example, the illumination wavelength may be 700 nm. Based on the table 200b, the lens position adjustment module 126 can determine a corresponding lens deflection 220 of 0.10 mm. The lens may initially be in initial lens position 230, with a deflection, e.g., of 0.05 mm. The lens position adjustment module 126 can output the lens position 240, with the deflection 220 of 0.10 mm.

Referring back to FIG. 1, the lens position adjustment module 126 can output the lens position 130a to the tunable lens 110a. The tunable lens 110a can then adjust to the lens position 130a designated by the lens position adjustment module 126. In some examples, the tunable lens 110a adjusts to the lens position 130a at the same time that the light source 105a illuminates the sample 104a with light at the illumination wavelength 124a. In some examples, the tunable lens 110a adjusts to the lens position 130a prior to the light source 105a illuminating the sample 104a with light at the illumination wavelength 124a. In some examples, the tunable lens 110a adjusts to the lens position 130a after the light source 105a illuminates the sample 104a with light at the illumination wavelength 124a.

In some implementations, the computer 120a includes a autofocus module 116. The autofocus module 116 can be used to adjust the focus of the lens assembly 108a and/or the tunable lens 110a based on a distance 114a to the sample 104a. In some examples, the autofocus module 116 may adjust the tunable lens 110a before the lens position adjustment module 126 outputs the lens position 130a to the tunable lens 110a. For example, when the sample 104a is positioned within the field of view of the camera 106a, the camera 106a may determine the sample distance 114a. For example, the camera 106a may measure the sample distance 114a using one or more range detection techniques. The camera 106 may determine the sample distance 114a, e.g., using phase detection autofocus, contrast detection autofocus, or other autofocus techniques.

The camera 106a and/or the autofocus module 116 can determine the sample distance 114a. The autofocus module 116 can then select an autofocus lens position 118 based on the sample distance 114a. This could be a setting of the lens assembly 108a, which may include autofocus motors to adjust the position of lens elements. In the example of FIG. 1, however, the autofocus module provides a lens autofocus setting to the lens position adjustment module 126 to be implemented using the tunable lens 110a. For example, the autofocus lens position 118 can include a number of millimeters offset from the neutral lens position 250 of the tunable lens 110a. The autofocus module 116 can output the autofocus lens position 118 to the lens position adjustment module 126. The lens position adjustment module 126 may then output a lens position 130a that accounts for the sample distance 114a as well as the illumination wavelength 124a. In other words, the lens position 130a output by the lens position adjustment module 126 may be a position that includes the setting determined by the autofocus module 116, further adjusted by an offset corresponding to the wavelength band currently being used, where the offset is determined using the table 128.

Though the system 100a includes the autofocus module 116, the system 100a may use other techniques to adjust lens position based on varying sample ranges. For example, as will be described with reference to FIG. 3, the lens position adjustment module 126 may include a multi-range wavelength-to-lens-deflection table in addition to, or instead of, the autofocus module 116. The multi-range wavelength-to-lens-deflection table can include calibration data for various sample ranges. In some implementations, if the sample distances can vary significantly, different levels of spectral-band-based adjustments may be needed for different distance ranges. The system may be calibrated so that, for example, one wavelength-to-lens-deflection table is used for one range of sample distances, another wavelength-to-lens-deflection table is used for another range of sample distances, and so on.

To generate hyperspectral images of the sample 104a, the light source 105a illuminates the sample 104a with light at the illumination wavelength 124a, while the dark chamber 102a blocks out external light. The light reflects from the sample 104a. The tunable lens 110a is positioned to a deflection based on the illumination wavelength 124a. The tunable lens 110a receives light reflected from the sample 104a and can focus the light through the lens assembly 108a to the sensors of the camera 106a. The camera 106a generates the images of the sample 104a.

The control module 122 may maintain a particular illumination wavelength 124a for a period of time, e.g., a number of milliseconds or seconds. Following the period of time, the control module 122 may then select a next illumination wavelength 124a. The control module 122 can then output the next illumination wavelength 124a to the light source 105a and to the lens position adjustment module 126 in order to re-adjust the lens position 130a.

Figure 1B:
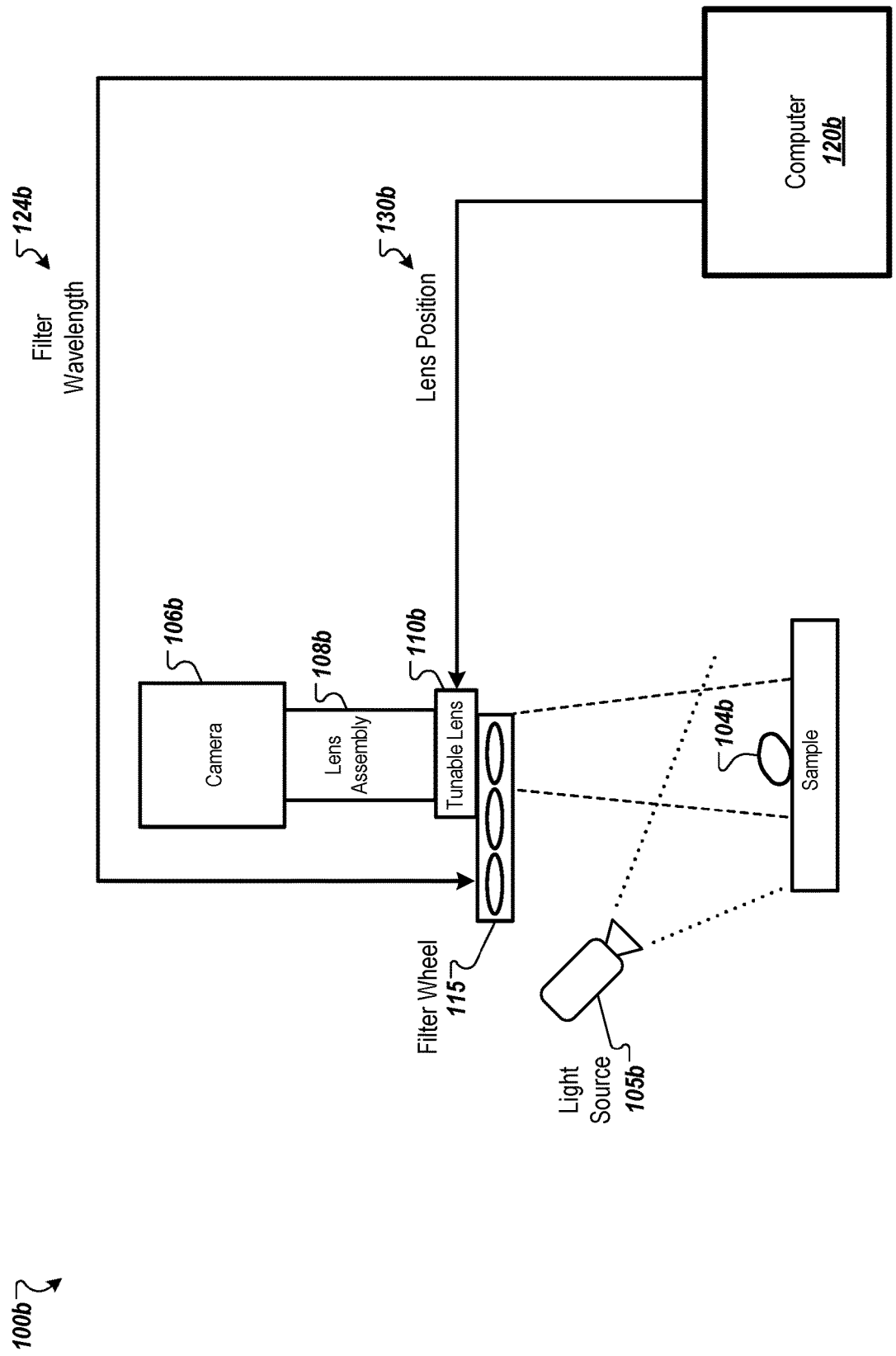
FIG. 1B shows another example system for hyperspectral imaging providing automated lens adjustment.
Figure 1C:
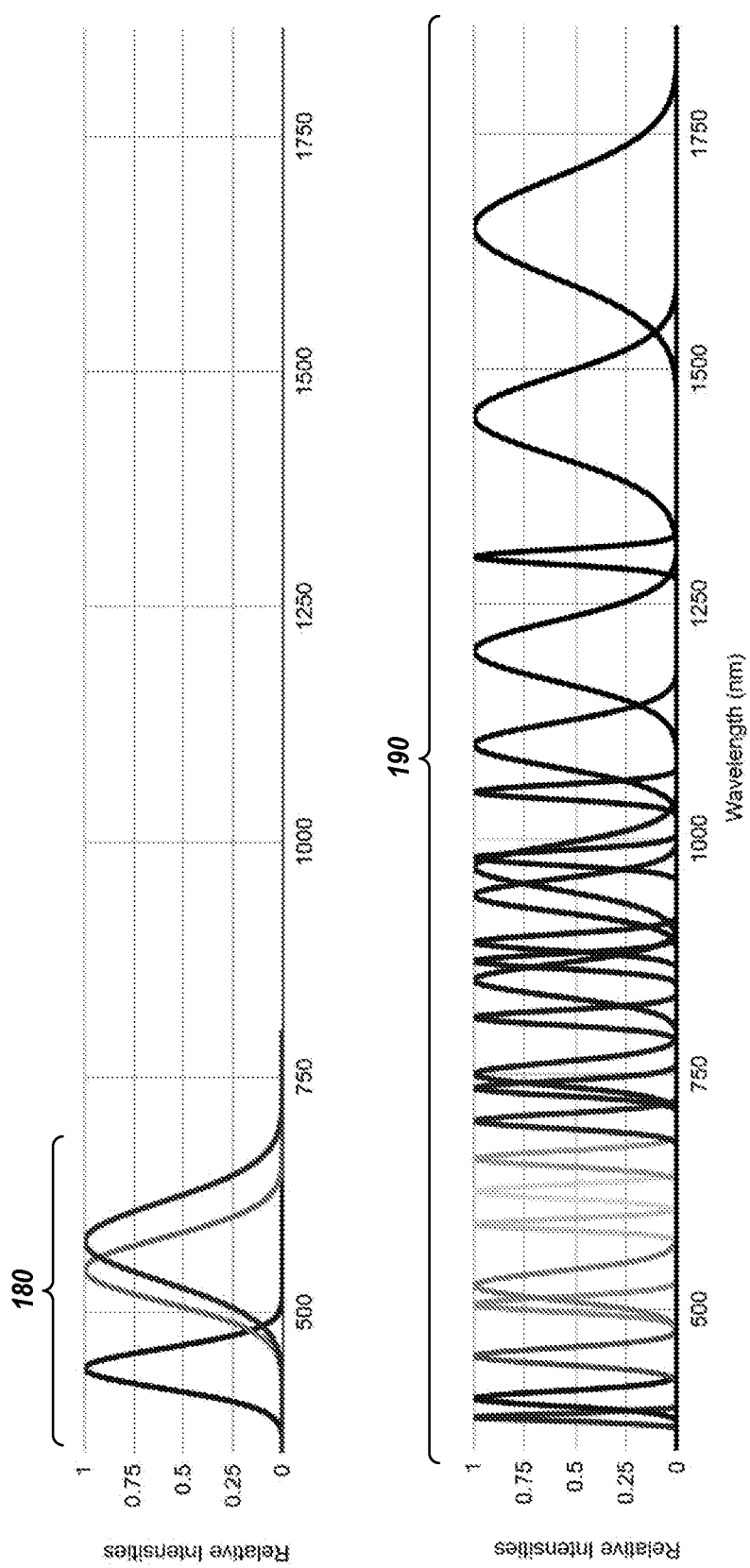
FIG. 1C shows an example of different wavelength bands.

FIG. 1B shows an example system 100b for hyperspectral imaging provided automated lens adjustment. The system 100b uses a filter wheel 115 to filter the light incident to a camera in order to capture an image using light for a specific spectral band. The system 100b includes a camera 106b, a lens assembly 108b, a tunable lens 110b, a light source 105b, and a filter wheel 115. The camera 106b and the tunable lens 110b may be similar to the camera 106a and the tunable lens 110a described with reference to FIG. 1A. The camera 106b, the tunable lens 110b, and the filter wheel 115 may be in electrical communication with a computer 120b or other control system. The computer 120b may be similar to the computer 120a, and may include a control module, a lens position adjustment module, and optionally a autofocus module.

Unlike the light source 105a presented in FIG. 1A, the light source 105b might not be tunable. Rather, the light source 105b may illuminate the sample 104b with light of multiple spectral bands simultaneously. For example, the light source 105 may activate LEDs of multiple spectral bands concurrently, so that the incident light on the sample 104b is not limited to the single spectral band currently used for imaging.

Additionally, unlike the system 100a, the system 100b might not include a dark chamber. Rather, the filter wheel 115 can filter out light that is not within a selected spectral band so that the image sensor of the camera 106b receives substantially only light of the selected spectral band. The filter wheel 115 can include multiple filters. Each filter can filter out various wavelengths of light, only allowing a narrow band of wavelengths to pass to the tunable lens 110a.

The filter wheel 115 can be positioned between a sample 104b and the tunable lens 110b. The filters of the filter wheel 115 may be arranged such that an individual filter aligns with the tunable lens 110b at a given time. The filter wheel 115 can then rotate, using a motor or other electromechanical actuator, to align a different individual filter with the tunable lens 110b and allow light for a different spectral band to be passed to the camera 106b.

In some examples, as controlled by the computer 120b, e.g., a control module of the computer 120b, the filter wheel 115 may filter for selected filter wavelengths 124b in a particular wavelength sequence or scanning pattern. For example, the control module may increase filter wavelength 124b progressively over time, or decrease filter wavelength 124b progressively over time. In some examples, the control module can control the filter wavelength 124b by rotating the filter wheel 115 to align selected filters with the tunable lens 110b.

In an example, the control module may rotate the filter wheel 115 to increase filter wavelength 124b progressively over time from a yellow spectral band of the electromagnetic spectrum to a SWIR spectral band. The control module can rotate the filter wheel 115 to align a first filter with the tunable lens 110b at a first time. The tunable lens 110b can receive energy reflected from the sample 104b at a first filter wavelength 124b, e.g., within the yellow spectral band. At a second time, the control module can rotate the filter wheel 115 to align a second filter with the tunable lens 110b. The tunable lens 110b can receive energy reflected from the sample 104b at a second filter wavelength 124b, e.g., within an orange spectral band. The control module can continue to rotate the filter wheel 115 to align different filters with the tunable lens 110b, progressing through spectral bands to the SWIR band.

In addition to controlling the filter wavelength 124b of light filtered by the filter wheel 115, the control module can also provide the filter wavelength 124b to the lens position adjustment module. Based on the filter wavelength 124b, the lens position adjustment module can then adjust a lens position 130b of the tunable lens 110b. Adjustment of the lens position 130b based on the filter wavelength 124b can be performed as described with reference to FIGS. 1A, 2A, and 2B.

To generate hyperspectral images of the sample 104b, the light source 105b illuminates the sample 104b with light from multiple spectral bands, and the light reflects from the sample 104b. The filter wheel 115 filters out light that is not within the selected spectral band. The tunable lens 110b is positioned to a deflection based on the filter wavelength 124b. The tunable lens 110b receives light reflected from the sample 104b and can focus the light through the lens assembly 108b to the sensors of the camera 106b. The camera 106b generates the images of the sample 104b.

The control module may maintain a particular filter wavelength 124b for a period of time. Following the period of time, the control module may then select a next filter wavelength 124b. The control module can output the next filter wavelength 124b to the filter wheel 115 and to the lens position adjustment module in order to re-adjust the lens position 130b.

FIG. 3 shows an example system 300 for hyperspectral imaging using multiple cameras. The system 300 includes a first camera 306 with a lens assembly 308 and a tunable lens 310. The system 300 includes a second camera 346 with lens assembly 348 and tunable lens 340. The system 300 also includes a light source 305 and a dark chamber 302. In some examples, the system 300 may include one or more filter wheels instead of, or in addition to, the dark chamber. The first camera 306, the tunable lens 310, the second camera 346, the tunable lens 340, and the light source 305 may be in electrical communication with a computer 320 or other control system. The computer 320 includes a control module 322 and a lens position adjustment module 326.

The first camera 306 may be a same type or a different type of camera than the second camera 346. For example, the first camera 306 may be a visible light camera, and the second camera 346 may be an infrared camera. In another example, the first camera 306 may be a camera with a InGaAs image sensor to capture images for bands in the range of 850-1700 nm, and the second camera 346 may be a camera with a CMOS image sensor that is used to capture images for bands in the range of 380-1000 nm. In the example of an InGaAs sensor and a CMOS sensor, the combination provides a wide range of sensitivity, e.g., 380-1700 nm, with a much less expensive and much higher resolution than would be possible with typical single sensors covering the same range.

A system with multiple cameras may have several advantages over a system with a single camera. For example, a system with multiple cameras may be able to detect light from a broader range of wavelengths than a system with a single camera. As a result, a system with multiple cameras may be able to produce higher quality, better resolution hyperspectral images than a system with a single camera.

The first camera 306 may be positioned at a same distance or at a different distance from the sample than the second camera 346. For example, a sample distance 314 for the first camera 306 may be greater than, less than, or equal to a sample distance 312 for the second camera 346. The sample distance 314 may be different from the sample distance 312 due to the camera 346 being positioned at a different height than the camera 306. The multiple cameras may be positioned at different heights, for example, in order to obtain images of a sample 304 from approximately a same perspective, e.g., a direct overhead view. In some examples, space may be limited within the black box 302. Thus, the multiple cameras may be stacked, or positioned at different heights, to reduce space occupied by the multiple cameras.

The computer 320 can store calibration data that enables the images from the different cameras 306, 346 to be aligned. Similarly, the computer 320 can control the cameras 306, 346 and their respective lenses to focus at the same or similar plane of focus on the sample 304.

The lens assembly 308 and the tunable lens 310 may be similar to or different from the lens assembly 348 and the tunable lens 340. For example, the lens assembly 308 may be fixed focal length lens assembly, while the lens assembly 348 may be a variable focal length lens assembly. In another example, the tunable lens 310 may have a maximum optical power of 15 dpt while the tunable lens 340 may have a maximum optical power of 10 dpt.

In some examples, as described with reference to FIG. 1A, the light source 305 may produce light in a particular wavelength sequence or scanning pattern. The control module 322 may control LEDs of the light source 305 to vary illumination wavelength 324 over time.

In addition to controlling the illumination wavelength 324 of light produced by the light source 305, the control module 322 can also provide the illumination wavelength 324 to the lens position adjustment module 326. Based on the illumination wavelength 324, the lens position adjustment module 326 can then adjust lens position 330 of the tunable lens 310, lens position 350 of the tunable lens 340, or both.

The lens position adjustment module 326 receives the illumination wavelength 324 from the control module 322. The lens position adjustment module 326 also receives the sample distance 312 from the first camera 306 and the sample distance 314 from the second camera 346. The lens position adjustment module 326 can reference a Multi-Range Wavelength-to-Lens-Deflection Table 328 in order to determine the lens positions 330 and 350. In some implementations, each camera 306, 346 (and its corresponding lenses) has a different table 328 based on its own characteristics and positioning.

The camera 306 and the camera 346 are positioned at different heights with respect to the sample 304. The adjustment of each tunable lens 310, 340, may be based in part on the sample distances 312, 314. The sample distances 312, 314 may vary over time. For example, the sample distances 312, 314 may change as samples of different sizes are provided for imaging. A smaller sample 304 will generally cause the sample distances 312, 314 to increase, while a larger sample 304 will generally cause the sample distances 312, 314 to increase. When a small sample 304, e.g., a sample 304 with a small height 303, is presented, the sample distances 312, 314 will increase. When a larger sample 304, e.g., a sample 304 with a larger height 303, is presented, the sample distances 312, 314 will decrease. The lens position adjustment module 326 can adjust the tunable lenses 310, 340 to accommodate these changes in sample ranges using the Multi-Range Wavelength-to-Lens-Deflection Table 328.

The sample distances 312, 314 may also vary based on configurations of the cameras 306, 346. For example, the camera 306, 346 may be adjustable in height, e.g., in the direction of height 303. The cameras 306, 346 may each be raised and/or lowered, e.g., by an operator. When the cameras 306, 346 are raised or lowered, the sample distances 312, 314 will change. The lens position adjustment module 326 can adjust the tunable lenses 310, 340 to accommodate these changes in height using Multi-Range Wavelength-to-Lens-Deflection Table 328.

Figures 4A, 4B:
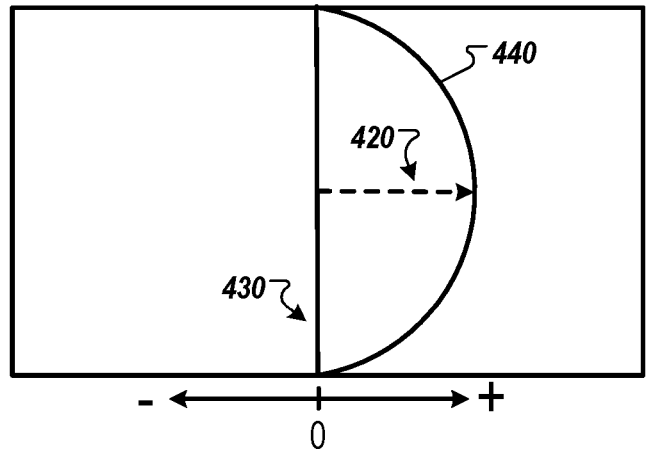
FIG. 4A shows an example diagram of tunable lens positions.
FIG. 4B shows an example table associating light wavelengths and sample distances with lens positions.

FIG. 4 shows an example table 400b associating light wavelengths 410 and sample ranges 414 with lens deflection 420. The table 400b can be, for example, a Multi-Range Wavelength to Lens Deflection Table 328 for a particular tunable lens 310 or 340. Although FIG. 4B shows a single table 400b, the lens position adjustment module 326 may include a first table for the first camera 306 and a second table for the second camera 346. Each individual table may be based on characteristics of the specific combination of camera, lens assembly, and tunable lens used.

The table 400b includes a range of wavelengths 410. For each wavelength 410, the table 400b provides a corresponding lens deflection 420 at a number of different sample ranges 414. In FIG. 4B, only a few wavelengths 410 and sample ranges 414 are shown. However, the table 400b can include any number of wavelengths 410 at any appropriate increment. In some examples, the table 400b can be generated through a calibration process performed prior to operation of the hyperspectral imaging system.

The lens deflection 420 can be a positive or negative value. The lens deflection 420 can be in reference, e.g., to a neutral lens position 430. Positive values of lens deflection 420 can indicate increasing deflection, e.g., adjusting to the right as shown in FIG. 4A.

The lens position adjustment module 326 can reference the table 400b to determine the lens deflection 420 for the illumination wavelength 410 and the sample range 414. For example, the illumination wavelength may be 800 nm and the sample distance 312 for the first camera 306 may be 80 mm. Based on the table 400b, the lens position adjustment module 326 can determine a corresponding lens deflection 420 of 0.20 mm. The tunable lens 310 may be in an initial neutral lens position 430, with a deflection of 0 mm. The lens position adjustment module 326 can output the lens position 440, with the deflection 420 of 0.20 mm, to the tunable lens 310.

The multi-range table 328 for a camera can be used in different ways in different implementations. As one example, the multi-range table 328 can incorporate focus information due to differing sample distances from the camera's sensor. Thus, the deflection value for a given sample distance and wavelength band may represent a combined adjustment to both correct for chromatic aberration and set the focus for the specified sample distance. In another example, the focus position to account for the sample distance may be determined separate from the multi-range table 328, and may even be set using the non-tunable lens elements. The different values of deflection based on different sample distances may represent different adjustments to correct for chromatic aberration, without adjusting the focus for different sample distances. For example, the non-tunable lens assembly may be used to focus for sample distance, or an autofocus module may supply a separate focus adjustment for the tunable lens, and the distance-based deflection values in the table 328 may indicate different levels of chromatic aberration correction for different sample distances, to be applied on top of the distance-based autofocus parameters.

Though the system 300 includes the Multi-Range Wavelength-to-Lens-Deflection Table 328, the system 300 may use other techniques to adjust lens position based on varying sample ranges. For example, as was described with reference to FIGS. 1A and 1B, the computer 320 may include a autofocus module in addition to, or instead of, the Multi-Range Wavelength-to-Lens-Deflection Table 328. The autofocus module may output an autofocus lens position to the lens position adjustment module 326. The lens position adjustment module 126 may then reference a wavelength-to-lens-deflection table to determine a lens position for each camera 306, 346 that accounts for the sample ranges as well as the illumination wavelengths.

Referring back to FIG. 3, the lens position adjustment module 326 can output the lens position 330 to the tunable lens 310, and the lens position 350 to the tunable lens 340. The tunable lenses 310, 340 can then adjust to the lens positions 330, 350 designated by the lens position adjustment module 326.

To generate hyperspectral images of the sample 304, the light source 305 illuminates the sample 304 with light at the illumination wavelength 324, while the dark chamber 302 blocks out external light. The light reflects from the sample 304. The tunable lenses 310 and 340 are positioned to deflections based on the illumination wavelength 324 and the sample distances 312 and 314, respectively. The tunable lenses 310 and 340 receive light reflected from the sample 304 and can focus the light through the respective lens assemblies 308, 348 to the sensors of the respective cameras 306, 346. The cameras 306, 346 generate the images of the sample 304.

While the adjustments made by the lens position adjustment module 326 tune the tunable lenses 310, 340 based on each camera's characteristics and position, additional calibration and adjustment between the camera 304, 306 may be necessary to generate an image of the sample 304. For example, the cameras 306, 346 may each output image data to the computer 320. The computer 320 can then adjust and combine the image data from each camera 304, 306 to generate a hyperspectral image of the sample 304. The computer 320 can use calibration data to account for differences between the spectral bands detected by each camera, and differences in height and perspective between the multiple cameras.

Figure 5:
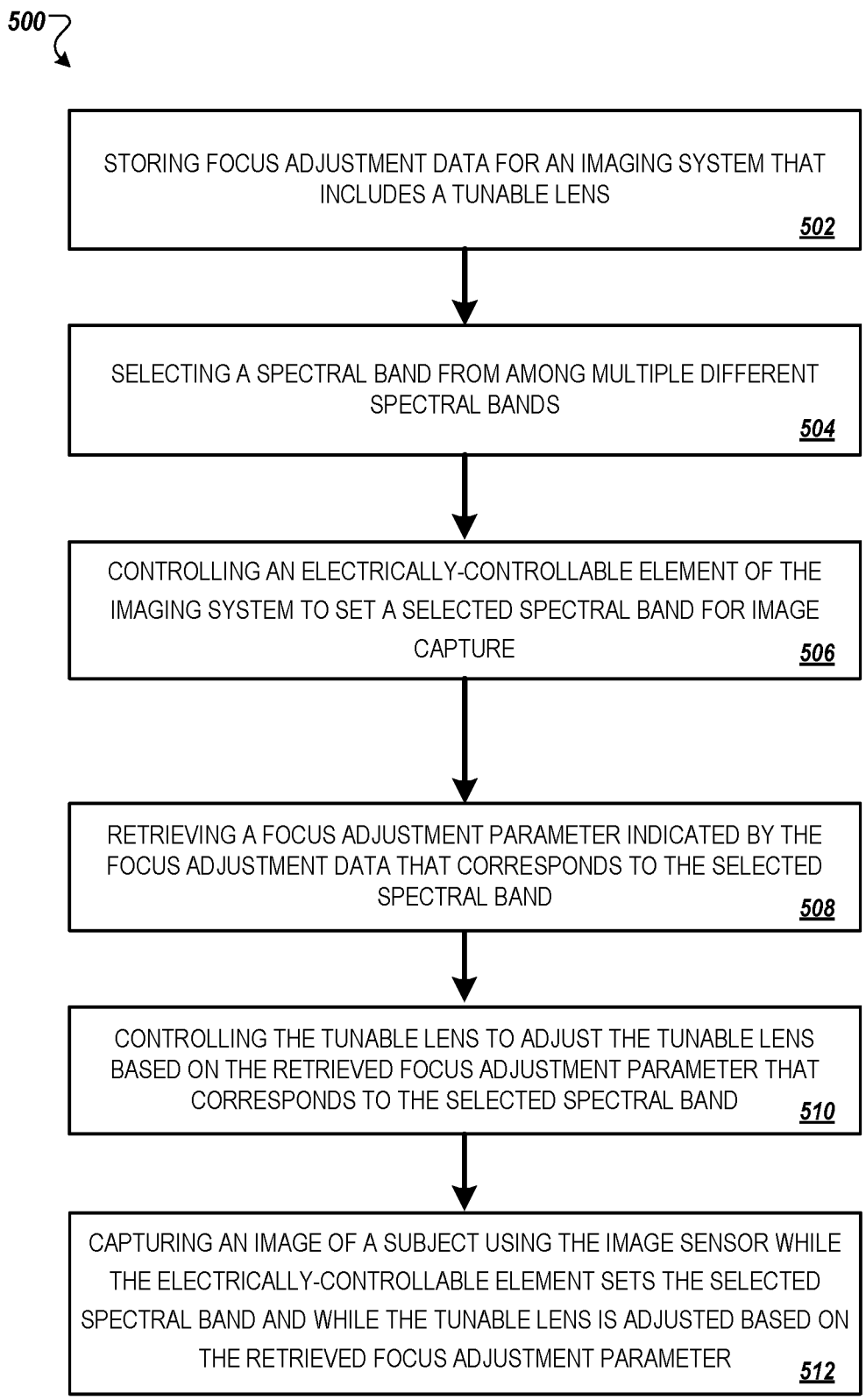
FIG. 5 shows a flow chart of an example process for hyperspectral optical lens focusing.

FIG. 5 shows an example process 500 that can be executed according implementations of the present disclosure. The process 500 can be executed by a control system, for example, the computer 120a of FIG. 1A.

The process 500 includes storing focus adjustment data for an imaging system that includes a tunable lens (502), selecting a spectral band from among multiple different spectral bands (504), controlling an electrically-controllable element of the imaging system to set a selected spectral band for image capture (506), retrieving a focus adjustment parameter indicated by the focus adjustment data that corresponds to the selected spectral band (508), controlling the tunable lens to adjust the tunable lens based on the retrieved focus adjustment parameter that corresponds to the selected spectral band (510), and capturing an image of a subject using the image sensor while the electrically-controllable element sets the selected spectral band and while the tunable lens is adjusted based on the retrieved focus adjustment parameter (512). In greater detail, the process 500 includes storing focus adjustment data for an imaging system that includes a tunable lens (502). The focus adjustment data can be stored in one or more data storage devices. The imaging system includes an electrically-controllable element configured to selectively set each of multiple different spectral bands for image capture. The focus adjustment data indicates different focus adjustment parameters corresponding to different spectral bands. For example, the focus adjustment data can indicate a wavelength deflection corresponding to different spectral bands. The focus adjustment data can include a lookup table including one or more focus adjustment parameters for each of the different spectral bands. The tunable lens can be an electro-wetting lens, a liquid crystal lens, or a polymer-based liquid lens.

The process 500 includes selecting a spectral band from among the multiple different spectral bands (504). The multiple different spectral bands can include multiple spectral bands outside a visible range of light. For example, the spectral bands can include bands within NIR, SWIR, and NUV regions of light.

The process 500 includes controlling the electrically-controllable element of the imaging system to set the selected spectral band for image capture (506). In some examples, the electrically-controllable element can be a light source including a set of light-producing elements that are configured to produce light of the different spectral bands. For example, the electrically-controllable element can be a light source including LEDs that produce light of various wavelengths. The control system can be configured to selectively activate the light-producing elements. In some examples, the electrically-controllable element is a filter assembly including multiple filters each configured to filter light to provide a different one of the different spectral bands. For example, the electrically-controllable element can be a filter wheel. The control system can be configured to selectively apply the filters to set the selected spectral band for image capture.

The process 500 includes retrieving the focus adjustment parameter indicated by the focus adjustment data that corresponds to the selected spectral band (508). The focus adjustment parameters can include, for each of multiple spectral bands, a predetermined adjustment for the spectral band. The adjustment can be configured to compensate for a difference between a focal length of the lens assembly for the spectral band and a focal length of the lens assembly for a reference spectral band.

The process 500 includes controlling the tunable lens to adjust the tunable lens based on the retrieved focus adjustment parameter that corresponds to the selected spectral band (510). The operations can include determining a sequence in which to illuminate the subject in the different spectral bands of light, and controlling the electrically-controllable element to sequentially set different spectral bands of light for image capture in the determined sequence. For example, the sequence may be a scanning sequence.

The operations can include adjusting the tunable lens to sequentially apply the focus adjustment parameters for the different spectral bands in a sequence that corresponds to the sequence for illuminating the subject. Changes to the adjustment of the tunable lens can be synchronized with changes in the spectral band of light set by the electrically-controllable element. The control system can be configured to instruct the adjustment to the tunable lens based on the retrieved focus adjustment parameter that corresponds to the selected spectral band before the electrically-controllable element adjusts the system to use light of the selected spectral band. In some examples, the control system is configured to perform autofocus adjustment to set a focus position of the lens assembly or the tunable lens based on a distance of the subject from the image sensor. The adjustment to the tunable lens can be based on the retrieved focus adjustment parameter and can be applied in addition to the autofocus adjustment.

The process 500 includes capturing an image of a subject using the image sensor while the electrically-controllable element sets the selected spectral band for image capture and while the tunable lens is adjusted based on the retrieved focus adjustment parameter that corresponds to the selected spectral band (512). The operations can include capturing a set of hyperspectral image data for the subject. The set of hyperspectral image data can include an image for each of the multiple different spectral bands. Each of the images can be captured while the electrically-controllable element sets a different spectral band for image capture. The tunable lens can be adjusted according to the focus adjustment parameter that corresponds to the spectral band set for image capture by the electrically-controllable element.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A system comprising:
   an image sensor;
   an electrically-controllable element arranged to set a spectral band for image capture by (i) selectively providing light for a selected spectral band of multiple different spectral bands or (ii) selectively filtering light to a selected spectral band of the multiple different spectral bands;
   a lens assembly;
   a tunable lens that is electrically adjustable to change a focal length of the tunable lens;
   one or more data storage devices storing focus adjustment data that indicates different focus adjustment parameters corresponding to the different spectral bands;
   a control system configured to perform operations comprising:
      selecting a spectral band from among the multiple different spectral bands;
      controlling the electrically-controllable element to set the selected spectral band for image capture;
      retrieving the focus adjustment parameter that corresponds to the selected spectral band;
      controlling the tunable lens to adjust the tunable lens based on the retrieved focus adjustment parameter that corresponds to the selected spectral band; and
      capturing an image of a subject using the image sensor while the electrically-controllable element sets the selected spectral band for image capture and while the tunable lens remains adjusted based on the retrieved focus adjustment parameter that corresponds to the selected spectral band.

2. The system of claim 1, wherein the operations comprise capturing a set of hyperspectral image data for the subject, the set of hyperspectral image data comprising an image for each of the multiple different spectral bands,
   wherein each of the images is captured while (i) the electrically-controllable element sets a different spectral band for image capture and (ii) the tunable lens is adjusted according to the focus adjustment parameter that corresponds to the spectral band set for image capture by the electrically-controllable element.

3. The system of claim 2, wherein the operations comprise:
   determining a sequence in which to illuminate the subject in the different spectral bands of light;
   controlling the electrically-controllable element to sequentially set different spectral bands of light for image capture in the determined sequence; and
   adjusting the tunable lens to sequentially apply the focus adjustment parameters for the different spectral bands in a sequence that corresponds to the sequence for illuminating the subject, wherein changes to the adjustment of the tunable lens are synchronized with changes in the spectral band of light set by the electrically-controllable element.

4. The system of claim 2, wherein the multiple different spectral bands comprise multiple spectral bands outside a visible range of light.

5. The system of claim 1, wherein the focus adjustment parameters comprise, for each of multiple spectral bands, a predetermined adjustment for the spectral band that is configured to compensate for a difference between (i) a focal length of the lens assembly for the spectral band and (ii) a focal length of the lens assembly for a reference spectral band.

6. The system of claim 1, wherein the tunable lens is an electro-wetting lens, a liquid crystal lens, or a polymer-based liquid lens.

7. The system of claim 1, wherein the control system is configured to instruct the adjustment to the tunable lens based on the retrieved focus adjustment parameter that corresponds to the selected spectral band before the electrically-controllable element adjusts the system to use light of the selected spectral band.

8. The system of claim 1, wherein the electrically-controllable element is a light source comprising a set of light-producing elements that are configured to produce light of the different spectral bands, and wherein the control system is configured to selectively activate the light-producing elements.

9. The system of claim 1, wherein the electrically-controllable element is a filter assembly comprising multiple filters each configured to filter light to provide a different one of the different spectral bands, and wherein the control system is configured to selectively apply the filters to set the selected spectral band for image capture.

10. The system of claim 1, wherein the control system is configured to perform autofocus adjustment to set a focus position of the lens assembly or the tunable lens based on a distance of the subject from the image sensor, and wherein the adjustment to the tunable lens based on the retrieved focus adjustment parameter is applied in addition to the autofocus adjustment.

11. The system of claim 1, wherein the focus adjustment data comprises a lookup table comprising one or more focus adjustment parameters for each of the different spectral bands.

12. A method comprising:
storing, in one or more data storage devices, focus adjustment data for an imaging system that includes a tunable lens, wherein the imaging system comprises an electrically-controllable element configured to selectively set each of multiple different spectral bands for image capture, and wherein the focus adjustment data indicates different focus adjustment parameters corresponding to the different spectral bands;
selecting a spectral band from among the multiple different spectral bands;
controlling the electrically-controllable element to set the selected spectral band for image capture;
retrieving the focus adjustment parameter that corresponds to the selected spectral band;
controlling the tunable lens to adjust the tunable lens based on the retrieved focus adjustment parameter that corresponds to the selected spectral band; and
capturing an image of a subject using the image sensor while the electrically-controllable element sets the selected spectral band for image capture and while the tunable lens is adjusted based on the retrieved focus adjustment parameter that corresponds to the selected spectral band.

13. The method of claim 12, wherein controlling the electrically-controllable element to set the selected spectral band for image capture comprises controlling an electrically-controllable light source to output light for the selected spectral band.

14. The method of claim 12, wherein controlling the electrically-controllable element to set the selected spectral band for image capture comprises controlling an electrically-controllable filter assembly to filter light to the selected spectral band.

15. The method of claim 12, comprising capturing a set of hyperspectral image data for the subject, the set of hyperspectral image data comprising an image for each of the multiple different spectral bands,
wherein each of the images is captured while (i) the electrically-controllable element sets a different spectral band for image capture and (ii) the tunable lens is adjusted according to the focus adjustment parameter that corresponds to the spectral band set for image capture by the electrically-controllable element.

16. The method of claim 15, comprising:
determining a sequence in which to illuminate the subject in the different spectral bands of light;
controlling the electrically-controllable element to sequentially set different spectral bands of light for image capture in the determined sequence; and
adjusting the tunable lens to sequentially apply the focus adjustment parameters for the different spectral bands in a sequence that corresponds to the sequence for illuminating the subject, wherein changes to the adjustment of the tunable lens are synchronized with changes in the spectral band of light set by the electrically-controllable element.

17. The method of claim 15, wherein the multiple different spectral bands comprise multiple spectral bands outside a visible range of light.

18. The method of claim 12, wherein the focus adjustment parameters comprise, for each of multiple spectral bands, a predetermined adjustment for the spectral band that is configured to compensate for a difference between (i) a focal length of the lens assembly for the spectral band and (ii) a focal length of the lens assembly for a reference spectral band.

19. The method of claim 12, wherein the tunable lens is an electro-wetting lens, a liquid crystal lens, or a polymer-based liquid lens.

20. One or more non-transitory computer-readable media storing software instructions that, when executed by one or more processing devices, cause the one or more processing devices to perform operations comprising:
storing focus adjustment data for an imaging system that includes a tunable lens, wherein the imaging system comprises an electrically-controllable element configured to selectively set each of multiple different spectral bands for image capture, and wherein the focus adjustment data indicates different focus adjustment parameters corresponding to the different spectral bands;
selecting a spectral band from among the multiple different spectral bands;
controlling the electrically-controllable element to set the selected spectral band for image capture;
retrieving the focus adjustment parameter that corresponds to the selected spectral band;

controlling the tunable lens to adjust the tunable lens based on the retrieved focus adjustment parameter that corresponds to the selected spectral band; and capturing an image of the subject using the image sensor while the electrically-controllable element sets the selected spectral band for image capture and while the tunable lens is adjusted based on the retrieved focus adjustment parameter that corresponds to the selected spectral band.

\* \* \* \* \*